(12) United States Patent
Qian et al.

(10) Patent No.: US 12,408,639 B1
(45) Date of Patent: Sep. 9, 2025

(54) ARTIFICIAL REEF

(71) Applicant: GUILIN UNIVERSITY OF TECHNOLOGY, Guangxi (CN)

(72) Inventors: Kai Qian, Guangxi (CN); Shihao Wu, Guangxi (CN); Zhi Li, Guangxi (CN); Heyun Yu, Guangxi (CN); Yang Ming, Guangxi (CN); Xiaohui Yu, Guangxi (CN); Bing Liu, Guangxi (CN); Yunhao Weng, Guangxi (CN); Jiangui Qin, Guangxi (CN)

(73) Assignee: GUILIN UNIVERSITY OF TECHNOLOGY, Guangxi (CN)

( * ) Notice: Subject to any disclaimer, the term of this patent is extended or adjusted under 35 U.S.C. 154(b) by 0 days.

(21) Appl. No.: 18/811,136

(22) Filed: Aug. 21, 2024

Related U.S. Application Data

(63) Continuation of application No. PCT/CN2024/104116, filed on Jul. 8, 2024.

(51) Int. Cl.
*A01K 61/73* (2017.01)
*A01K 61/70* (2017.01)

(52) U.S. Cl.
CPC .................. *A01K 61/73* (2017.01)

(58) Field of Classification Search
CPC ........ A01K 61/73; A01K 61/75; A01K 61/77; A01K 61/78
See application file for complete search history.

(56) References Cited

U.S. PATENT DOCUMENTS

| | | | |
|---|---|---|---|
| 3,561,402 A * | 2/1971 | Ishida | A01K 61/70 119/221 |
| 3,898,958 A * | 8/1975 | Pranis, Jr. | E02B 3/046 119/221 |
| 4,947,791 A * | 8/1990 | Laier | A01K 61/70 405/32 |
| 4,993,362 A * | 2/1991 | Jimbo | A01K 61/70 119/221 |
| 5,109,796 A * | 5/1992 | Monus | A01K 61/70 119/221 |
| 6,089,191 A * | 7/2000 | Calinski | A01K 61/70 119/239 |
| 2002/0069832 A1* | 6/2002 | Smith | A01K 61/70 119/221 |

FOREIGN PATENT DOCUMENTS

KR 20220006262 A * 1/2022 ............ A01K 61/70

* cited by examiner

*Primary Examiner* — Monica L Perry
(74) *Attorney, Agent, or Firm* — WCF IP

(57) ABSTRACT

Provided is an artificial reef, including a bottom plate, a reef main body of a hollow structure and connected to the bottom plate, and a pipe rack arranged in the reef main body. Two ends of the reef main body are open. All sides of the reef main body are obliquely arranged from bottom to top towards an inner side. The pipe rack is formed by assembling multiple pipe bodies into a grid shape. The pipe bodies are in communication with each other at intersections. Both ends of each pipe body extend through and are fixed to two sides of the reef main body respectively to communicate with the outside. The bottom plate and the reef main body are made of a reinforced concrete structure, and the reinforced concrete structure is made of high corrosion-resistant steel bars and modified seawater and sea sand concrete.

10 Claims, 5 Drawing Sheets

ARTIFICIAL REEF

CROSS-REFERENCE TO RELATED APPLICATION

This application is a Continuation-in-Part of International Patent Application No. PCT/CN2024/104116, filed on Jul. 8, 2024, which designates the United States, and which International Application, in turn, claims priority to Chinese Patent Application No. 202410865132.4, filed on Jun. 28, 2024, all of which are incorporated herein by reference in their entirety.

TECHNICAL FIELD

The present disclosure relates to the field of ecological environment in waters, and in particular to an artificial reef.

BACKGROUND

Artificial reef is a structure artificially placed in natural water environment to repair and optimize the ecological environment of water areas. Through proper production and placement, the artificial reef can be used to proliferate and trap various marine organisms and achieve the purpose of improving the ecological environment of water areas. After the artificial reef is put into use, the complex structure of the reef itself and the new environment of flow, light, sound, taste and biology formed after being put into use provide places for different fish to seek bait, avoid harm, lay eggs and locate, thus attracting many fish, which is the general mechanism of fish collection in the artificial reef.

The artificial reef, after being put into the seabed, will be affected by the reaction force of water flow and the corrosion of seawater salt substances while changing the structure of the seabed flow field. The reinforced concrete structure adopted by the existing artificial reef has weak corrosion resistance, which will be corroded and damaged under long-term action and is easy to disintegrate and break when affected by the reaction force of the water flow. Under the influence of the flow field, the artificial reef is destroyed, and its ecological function is weakened or even lost due to the influence, and the disintegrated fragments may crush and destroy the local original coral reef Meanwhile, the existing artificial reefs are not effective in gathering fish.

SUMMARY

In order to solve the technical problem above, the present disclosure provides an artificial reef, which has strong corrosion resistance, and can improve durability and produce good fish gathering effect.

To achieve the objective above, the present disclosure employs the following technical solution:

An artificial reef provided by the present disclosure includes a bottom plate, a reef main body, and a pipe rack, wherein the reef main body is of a hollow structure, and an upper end and a lower end of the reef main body are open; a bottom of the reef main body is connected to the bottom plate; all sides of the reef main body are arranged obliquely towards an inner side from bottom to top; the pipe rack is formed by assembling multiple pipe bodies into a grid shape, and each two of the pipe bodies, connected to each other, are in communication with each other at an intersection thereof; the pipe rack is arranged in the reef main body; both ends of each pipe body of the pipe bodies extend through two sides of the reef main body respectively to communicate with an outside, and both ends of each pipe body are fixed to the two sides of the reef main body, respectively; and each of the bottom plate and the reef main body is made of a reinforced concrete structure, and the reinforced concrete structure is made of high corrosion-resistant steel bars and modified seawater and sea sand concrete by pouring.

In some embodiments, multiple groups of holes are sequentially formed in each side of the reef main body from bottom to top, the both ends of each pipe body are located in respective groups of holes, and multiple hanging rings are arranged at a top of the reef main body.

In some embodiments, four groups of holes are sequentially formed in each side of the reef main body from bottom to top, the four groups of holes are a first group of holes, a second group of holes, a third group of holes, and a fourth group of holes from bottom to top; the first group of holes includes multiple first holes sequentially formed in a side of the reef main body along a length direction of the side of the reef main body; the second group of holes includes multiple second holes sequentially formed in the side of the reef main body along the length direction of the side of the reef main body; the third group of holes includes multiple third holes sequentially formed in the side of the reef main body along the length direction of the side of the reef main body; and the fourth group of holes includes multiple fourth holes sequentially formed in the side of the reef main body along the length direction of the side of the reef main body.

In some embodiments, the sizes of the first holes, the second holes, the third holes and the fourth holes decrease in turn, the first holes are rectangular holes, and the second holes, the third holes and the fourth holes are all circular holes.

In some embodiments, one end of each pipe body is fixed into one third hole of the third holes by a fixing assembly, and the fixing assembly includes an embedded bolt, a locking nut, a limiting sheet, and two fixing bolts; the embedded bolt is pre-embedded in a bottom surface of the third hole; lower parts of both ends of each pipe body each are provided with a bolt connecting hole; the bolt connecting hole is configured for making the embedded bolt to pass through; the locking nut is installed on an upper part of the embedded bolt; the limiting sheet covers an upper part of one end of the pipe body; and each of both ends of the limiting sheet is fixed to a side wall of the third hole by one fixing bolt of the two fixing bolts.

In some embodiments, a fence is arranged in each of the fourth holes.

In some embodiments, the bottom plate is a hollow rectangular plate, and the reef main body includes four load-bearing columns, four side walls, four cross beams, four first supporting beams, and four second supporting beams; lower ends of the four load-bearing columns are arranged on four corners of the bottom plate, respectively, the four side walls are arranged between two adjacent load-bearing columns respectively, and bottoms of the four side walls are connected to the bottom plate; the plurality of groups of holes are sequentially formed in each side wall from bottom to top; the four cross beams are arranged at tops of the four side walls respectively, and both ends of each cross beam are connected to two respective load-bearing columns of the four load-bearing columns; one hanging ring is arranged at a top of each load-bearing column of the four load-bearing columns, and the four first supporting beams are arranged between two adjacent cross beams respectively, and the four second supporting beams are arranged between two adjacent side walls respectively.

In some embodiments, multiple aligning connection holes are sequentially formed in the pipe body in a length direction of the pipe body, each aligning connection hole penetrates through both sides of the pipe body, and multiple through holes are formed in a side wall of the pipe body.

In some embodiments, the modified seawater and sea sand concrete includes seawater, sea sand, a steel bar rust inhibitor, a chloride ion curing agent, cement, gravel, a water reducing agent, fly ash, mineral powder, and a defoaming agent.

In some embodiments, the steel bar rust inhibitor includes 50 parts of N, N-dimethyl ethanolamine, 30 parts of polycarboxylic acid terpolymer, 10 parts of 2-phenylimidazoline quaternary ammonium salt, 15 parts of hydroxide, 5 parts of waterborne polyaniline, 5 parts of polyhydric alcohol phosphate ester, and 60 parts of water.

Compared with the prior art, the present disclosure has the following technical effects:

Each of the bottom plate and the reef main body of the artificial reef is made of a reinforced concrete structure, and the reinforced concrete structure is made of high corrosion-resistant steel bars and modified seawater and sea sand concrete, which has strong corrosion resistance, can improve the durability of the artificial reef, is not easy to be damaged during use, and can cooperate well with the original local coral reef. The reef main body adopts a structure with a small upper end and a large lower end, and each side is an inclined in a certain slope, which is conducive to forming an upward flow to lift nutrients on the seabed, so as to promote the exchange and mixing of seawater around the reef, attract fish to gather and improve the ecological environment. The outer surfaces of the pipe bodies can provide a foundation for algae, shellfish and other attached organisms to gather, thereby forming a large-scale algae net to provide more baits for fish. Meanwhile, the insides of the pipe bodies can provide a living place for fish, and can also provide more hidden shelters, thus attracting fish more quickly.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
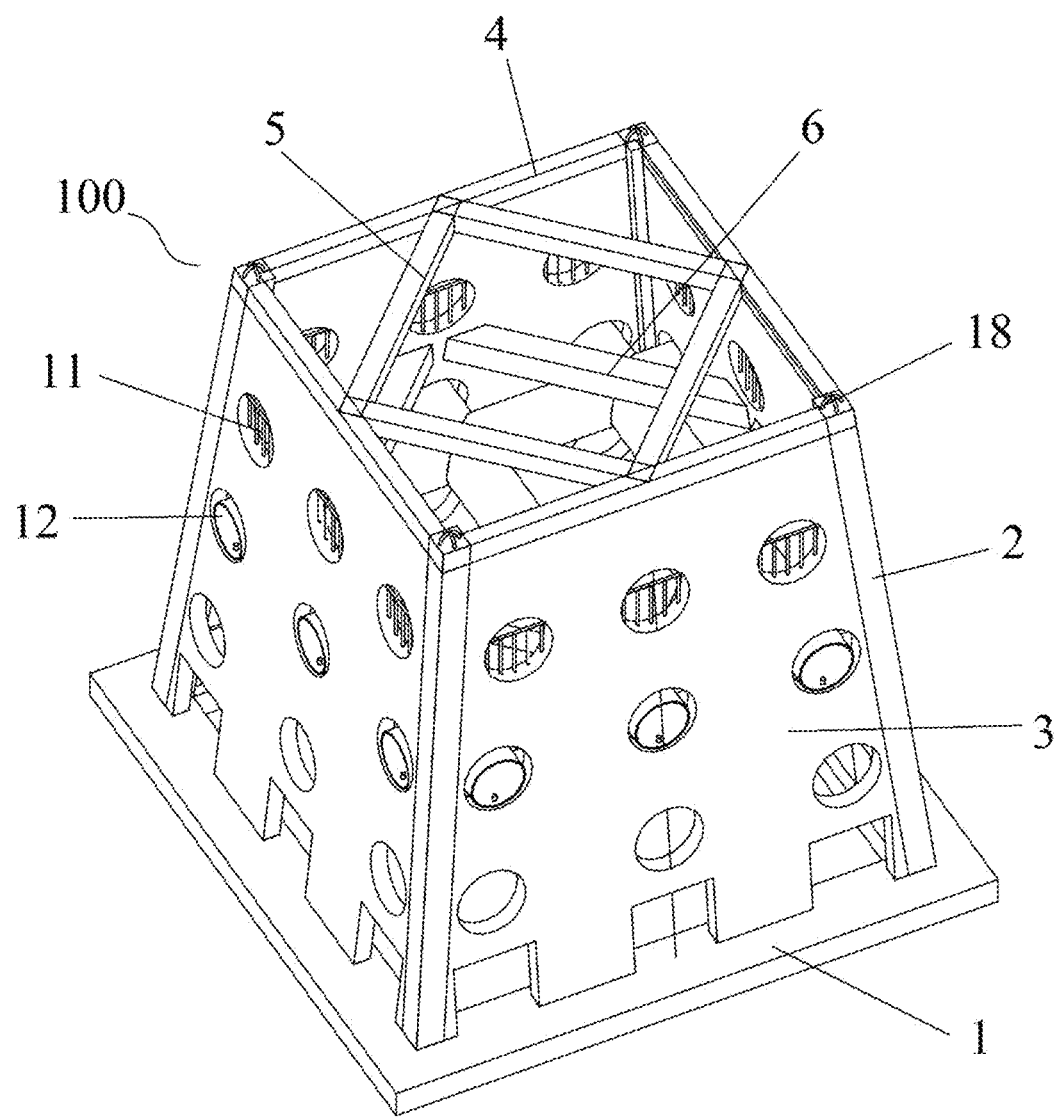
FIG. 1 is a three-dimensional structural diagram of an artificial reef according to the present disclosure.
Figure 2:
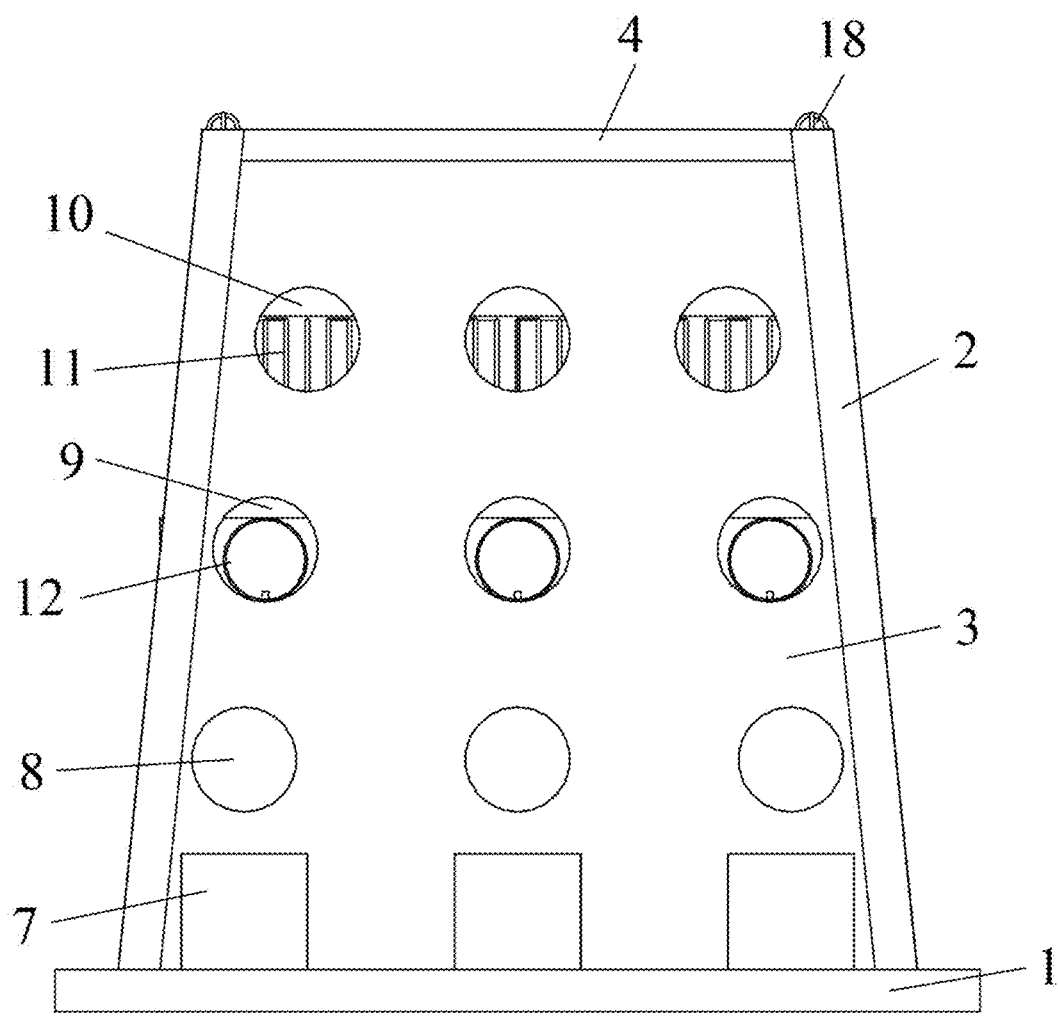
FIG. 2 is a front view of an artificial reef according to the present disclosure.
Figure 3:
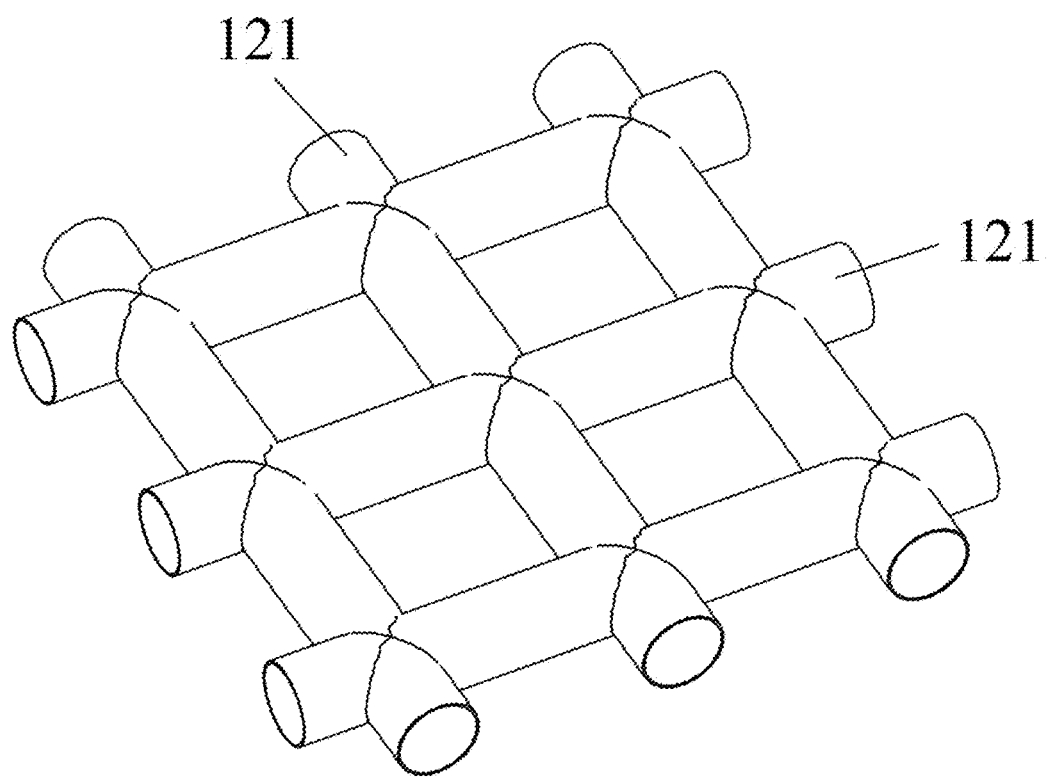
FIG. 3 is a structural schematic diagram of a pipe rack in an artificial reef according to the present disclosure.
Figure 4:
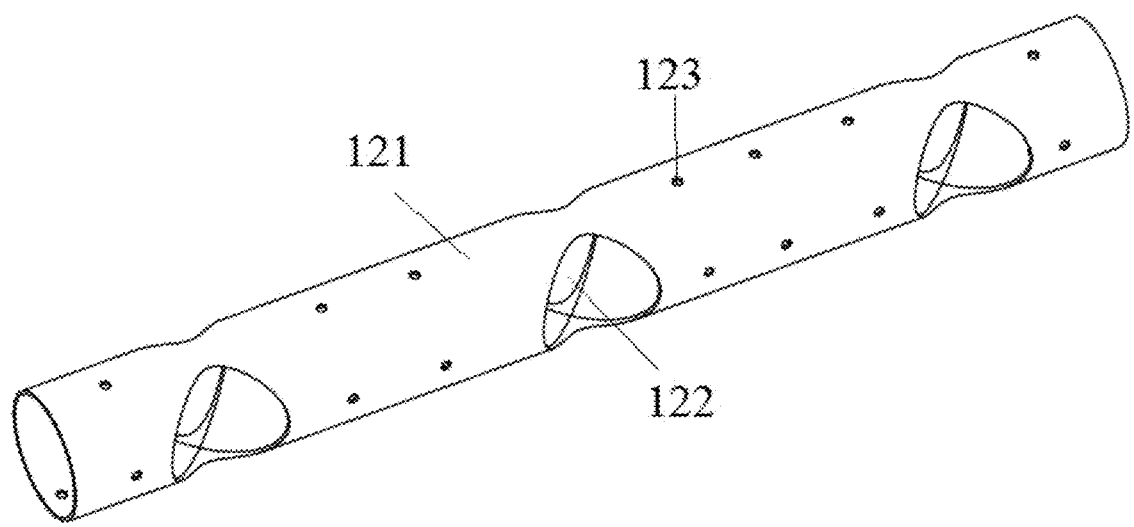
FIG. 4 is a structural schematic diagram of a pipe body in an artificial reef according to the present disclosure.
Figure 5:
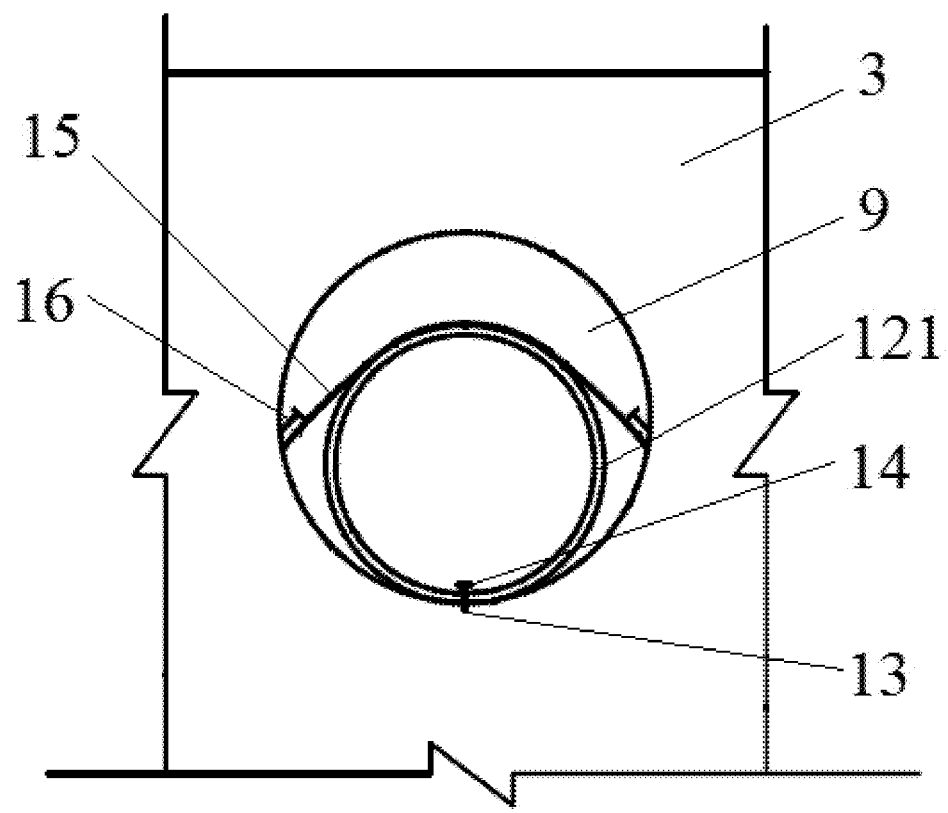
FIG. 5 is a schematic diagram of installation of a pipe body in an artificial reef according to the present disclosure.
Figure 6:
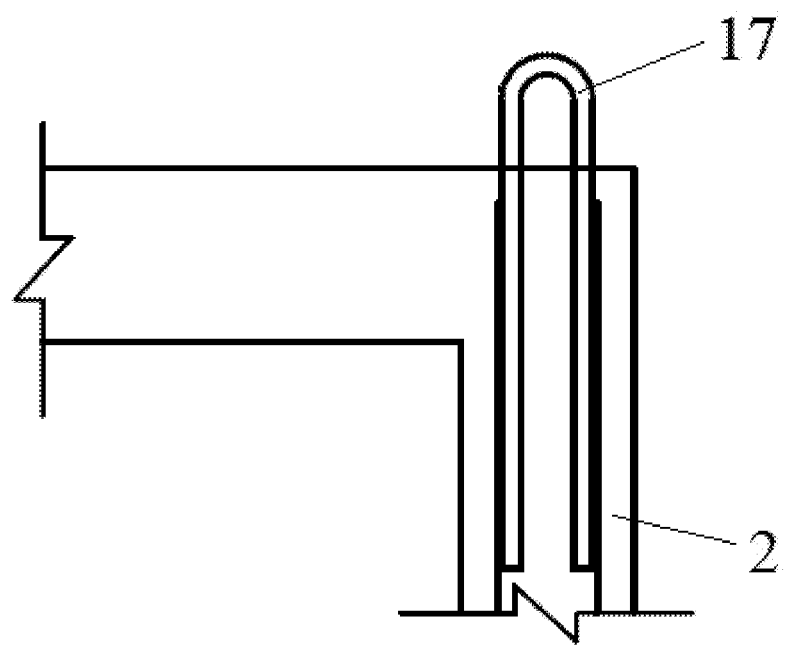
FIG. 6 is a structural schematic diagram of a top steel bar of a load-bearing column in an artificial reef according to the present disclosure.

In the drawings: 100, artificial reef, 1, bottom plate; 2, load-bearing column; 3, side wall; 4, cross beam; 5, first supporting beam; 6, second supporting beam; 7, first hole; 8, second hole; 9, third hole; 10, fourth hole; 11, fence; 12, pipe rack; 121, pipe body; 122, aligning connection hole; 123, through hole; 13, embedded bolt; 14, locking bolt; 15, limiting sheet; 16, fixing bolt; 17, top steel bar; 18, hanging ring.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide an artificial reef, which has strong corrosion resistance, and can improve durability and produce good fish gathering effect.

In order to make the objectives, features and advantages of the present disclosure more clearly, the present disclosure is further described in detail below with reference to the embodiments.

As shown in FIG. 1 to FIG. 8, an artificial reef 100 is provided in this embodiment, including a bottom plate 1, a reef main body, and a pipe rack 12. The reef main body is of a hollow structure, and upper and lower ends of the reef main body are open. The bottom of the reef main body is connected to the bottom plate 1. All sides of the reef main body are all obliquely arranged from bottom to top towards an inner side, that is, the reef main body is of a structure with a small upper end and a large lower end, and each side is an inclined in a certain slope, which is conducive to forming an upward flow to lift nutrients on the seabed, so as to promote the exchange and mixing of seawater around the reef, attract fish to gather and improve the ecological environment, and ensures that the artificial reef is difficult to be washed away by a marine current.

The pipe rack 12 is formed by assembling multiple pipe bodies 121 into a grid shape. Intersections of two connected pipe bodies 121 are all in communication with each other, and the pipe rack 12 is arranged in the reef main body. Both ends of each pipe body 121 respectively extend through two sides of the reef main body to communicate with the outside, and both ends of each pipe body 121 are fixed to the two sides of the reef main body, respectively. The outer surfaces of the pipe bodies 121 can provide a foundation for algae, shellfish and other attached organisms to gather, thereby forming a large-scale algae net to provide more baits for fish. Meanwhile, the insides of the pipe bodies 121 can provide a living place for fish, and can also provide more hidden shelters, thus attracting fish more quickly.

Each of the bottom plate 1 and the reef main body is made of a reinforced concrete structure, and the reinforced concrete structure is made of high corrosion-resistant steel bars and modified seawater and sea sand concrete, which has strong corrosion resistance, can improve the durability of the artificial reef 100, is not easy to be damaged during use, and can cooperate well with the original local coral reef.

Multiple groups of holes are sequentially formed in each side of the reef main body from bottom to top, both ends of each pipe body 121 are respectively located in respective groups of holes, and multiple hanging rings 18 are arranged at the top of the reef main body.

Four groups of holes are sequentially formed in each side of the reef main body from bottom to top, and the four groups of holes are a first group of holes, a second group of holes, a third group of holes, and a fourth group of holes from bottom to top. The first group of holes includes multiple first holes 7 sequentially formed in a side of the reef main body along the length direction of the side of the reef main body. The second group of holes includes multiple second holes 8 sequentially formed in the side of the reef main body along the length direction of the side of the reef main body. The third group of holes includes multiple third holes 9 sequentially formed in the side of the reef main body along the length direction of the side of the reef main body. The fourth group of holes includes multiple fourth holes 10 sequentially formed in the side of the reef main body along the length direction of side of the the reef main body.

In this embodiment, the multiple groups of holes on each side are arranged in layers, and the sizes of the first holes 7, the second holes 8, the third holes 9 and the fourth holes 10 decrease in turn, which is beneficial to the coexistence of fish with different body types.

In this embodiment, the first holes 7 each are a rectangular hole, and the second holes 8, the third holes 9 and the fourth holes 10 are all circular holes.

Both ends of each pipe body 121 are respectively located in the two third holes 9, and one end of each pipe body 121 is fixed into one of the third holes 9 by a fixing assembly. The fixing assembly includes an embedded bolt 13, a locking nut 14, a limiting sheet 15, and two fixing bolts 16. The embedded bolt 13 is pre-embedded in a bottom surface of the third hole 9, and lower parts of both ends of each pipe body 121 each are provided with a bolt connecting hole which is configured for making the embedded bolt 13 to pass through. The locking nut 14 is installed on an upper part of the embedded bolt 13. The locking nut 14 is screwed to be abutted against an inner side wall of the pipe body 121, thus fixing the pipe body 121. In order to install the pipe body 121 in the third hole 9 more firmly, the limiting sheet 15 covers an upper part of one end of the pipe body 121, and each of both ends of the limiting sheet 15 is fixed to a side wall of the third hole 9 by one fixing bolt 16.

The limiting sheet 15 in this embodiment is an aluminum sheet with a thickness of 2 mm and a width of 120 mm. During use, the aluminum sheet is bent as an arc structure to cover an upper part of the pipe body 121. The pipe body 121 in this embodiment is made of PVC (polyvinyl chloride).

A fence 11 is arranged in each fourth hole 10, and the fourth hole 10 is divided into multiple small areas by the fence 11, thereby limiting the size of fish that can pass through. The fence 11 in this embodiment is made of steel.

The bottom plate 1 in this embodiment is a hollow rectangular plate, which can be firmly placed on the seabed under the action of settlement and its own weight, and has a wide bottom surface and is not easy to topple, thus providing a relatively stable living place for fish schools.

The fish main body includes four load-bearing columns 2, four side walls 3, four cross beams 4, four first supporting beams 5, and four second supporting beams 6. Lower ends of the four load-bearing columns 4 are arranged on four corners of the bottom plate 1, respectively, and the four side walls 3 are arranged between two adjacent load-bearing columns 2, respectively. Both sides of each side wall 3 are respectively connected to the two load-bearing columns 2, and the bottoms of the side walls 3 are connected to the bottom plate 1. Multiple groups of holes are sequentially formed in each side wall 3, and one cross beam 4 is arranged at the top of each side wall 3, and both ends of each cross beam 4 are connected to the two load-bearing columns 2. A hanging ring 18 is arranged at the top of each load-bearing column 2, one of the first supporting beams 5 is arranged between any two adjacent cross beams 4, and one of the second supporting beams 6 is arranged between any two adjacent side walls 3. By arranging the first supporting beams 5 and the second supporting beams 6, the structure of the reef main body is firmer. In this embodiment, objects, such as a hemp rope, can be bound on the first supporting beams 5 and the second supporting beams 6, so as to better simulate the marine environment such as seaweeds.

In this embodiment, each hanging ring 18 is a cross-shaped hanging ring, and the cross-shaped hanging ring is lapped and welded with the top steel bar 17 of the load-bearing column 2, with a weld length not less than 250 mm.

In this embodiment, the reef main body is of a radiation symmetrical structure, and each side is provided with multiple groups of holes for the water flow and entrained sediment to pass through, thereby avoiding the accumulation of sediment on the side of the reef main body, alleviating a phenomenon of sediment scouring and siltation, and preventing the artificial reef 100 from being buried or overturned as the bottom seabed is hollowed out by the marine current.

Outer and inner edges of the top surface of the reef main body are both square, and outer and inner edges of the bottom surface of the reef main body are both square. An outer side length of the top surface of the reef main body is 3400 mm, an outer side length of the bottom surface of the reef main body is 3800 mm, the centers of the top surface and the bottom surface are aligned, and the height between the top surface and the bottom surface is 4000 mm.

In this embodiment, the outer side length of the bottom plate 1 is longer than that of the bottom surface of the reef main body, and a difference between the outer side length of the bottom plate 1 and the outer side length of the bottom surface of the reef main body is more than 200 mm. An inner side length of the bottom plate 1 is smaller than that of the bottom surface of the reef main body, and a difference between the inner side length of the bottom surface of the reef main body and the inner side length of the bottom plate 1 is more than 200 mm.

Multiple aligning connection holes 122 are sequentially formed in the pipe body 121 in a length direction, and each aligning connection hole 122 penetrates through both sides of the pipe body 121. Multiple through holes 123 are formed in a side wall of the pipe body 121 to provide channels for small fish, which are beneficial to the growth of fish food such as algae, thus achieving the effects of attracting fish, gathering fish and improving ecology. In this embodiment, there are no more than 20 through holes 123 in the side wall of the pipe body 121, which can be arranged regularly or randomly.

In this embodiment, the first group of holes includes three first holes 7, the second group of holes includes three second holes 8, the third group of holes includes three third holes 9, and the fourth group of holes includes three fourth holes 10. The pipe rack 12 includes six pipe bodies 121, and three aligning connection holes 122 are sequentially formed in each pipe body 121 in the length direction. The six pipe bodies 121 are divided into two groups, the three pipe bodies 121 in the first group are arranged in parallel and at intervals, the three pipe bodies 121 in the second group are perpendicular to the three pipe bodies 121 in the first group, and the pipe bodies 121 in the second group are sequentially inserted into three corresponding aligning connection holes 122 of the three pipe bodies 121 in the first group. The three aligning connection holes 122 of the pipe bodies 121 in the second group correspond to the aligning connection holes 122 in the three pipe bodies 121 in the first group, making the intersections of any two connected pipe bodies 121 communicate with each other.

In this embodiment, a high corrosion-resistant steel bar is a low-cost high-strength corrosion-resistant steel bar developed with low-cost Cr, Ti and Al elements. Cr in the high corrosion-resistant steel bar can promote the transformation of a rust layer to compact α-FeOOH. Al and Ti provide anodic protection, and meantime, Al produces compact AlzO3 dispersed on the surface of the rust layer to delay the corrosion of a corrosion medium to a matrix, and Ti can be enriched in the rust layer in the form of dots or flakes, which plays a certain role in protecting the intergranular corrosion.

In this embodiment, the modified seawater and sea sand concrete includes seawater, sea sand, a steel bar rust inhibitor, a chloride ion curing agent, cement, gravel, a water reducing agent, fly ash, mineral powder, and a defoaming agent. The chloride ion curing agent is used to block the movement of chloride ions in the seawater and sea sand to prevent corrosion.

There are two preparation methods for the chloride ion curing agent:

The first preparation method is as follows: 10 g of sodium meta-aluminate+90 g of water=100 g (solution a)

4.35 g of calcium oxide+2.95 g of calcium nitrite monohydrate+92.7 g of water=100 g (solution b);

at a room temperature, the solution b is slowly dropped into the solution a, and a precipitate appears when half of the solution b is added (1 h). After the dropping is finished, the temperature of a mixture of the solution a and the solution b is raised to 60° C., and the mixture is crystallized at a room temperature for 4 h, and then filtered to obtain the chloride ion curing agent.

The second preparation method is as follows: 10 g of sodium meta-aluminate+90 g of water=100 g (solution a)

2 g of calcium hydroxide+4 g of calcium nitrite monohydrate+94 g of water=100 g (solution b);

at a room temperature: the solution b is slowly dropped into the solution a, and a precipitate appears when half of the solution b is added (1 h). After the dropping is finished, the temperature of a mixture of the solution a and the solution b is raised to 60° C., and the mixture is crystallized at a room temperature for 4 h, and then filtered to obtain the chloride ion curing agent.

Specifically, the steel bar rust inhibitor includes 50 parts of N, N-dimethyl ethanolamine, 30 parts of polycarboxylic acid terpolymer, 10 parts of 2-phenylimidazoline quaternary ammonium salt, 15 parts of hydroxide, 5 parts of waterborne polyaniline, 5 parts of polyhydric alcohol phosphate ester, and 60 parts of water. In this embodiment, pH of the steel bar rust inhibitor is 12.4.

The preparation method for the steel bar rust inhibitor includes the following steps: (1) adding water into a container, then heating the water to 50° C., sequentially adding N, N-dimethyl ethanolamine, 2-phenylimidazoline quaternary ammonium salt and waterborne polyaniline, and stirring for 5 minutes; and (2) continuing to heat to 65° C., then adding polyhydric alcohol phosphate ester and polycarboxylic acid terpolymer again and stirring for 5 min, and finally adding hydroxide to adjust the pH value.

Figure 7:
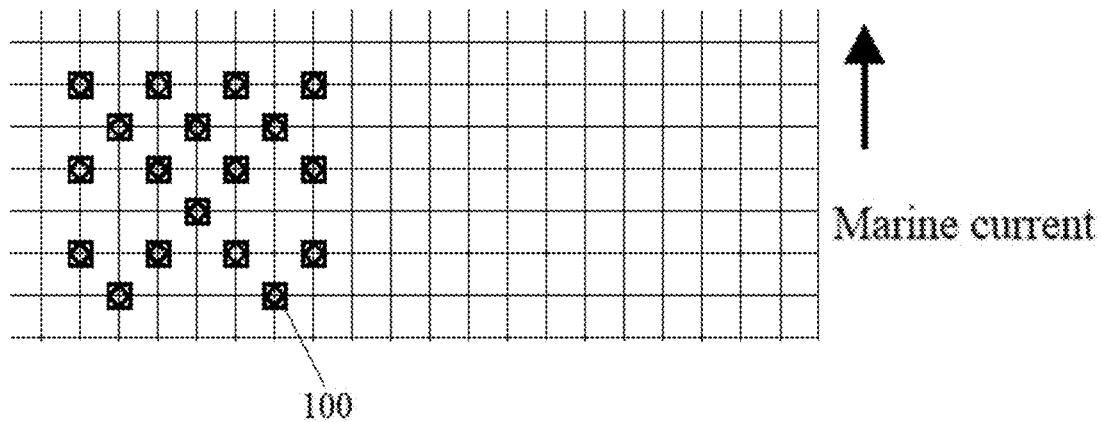
FIG. 7 is a schematic diagram of multiple artificial reefs according to the present disclosure when they are arranged in the form of 241434 in a marine current direction.
Figure 8:
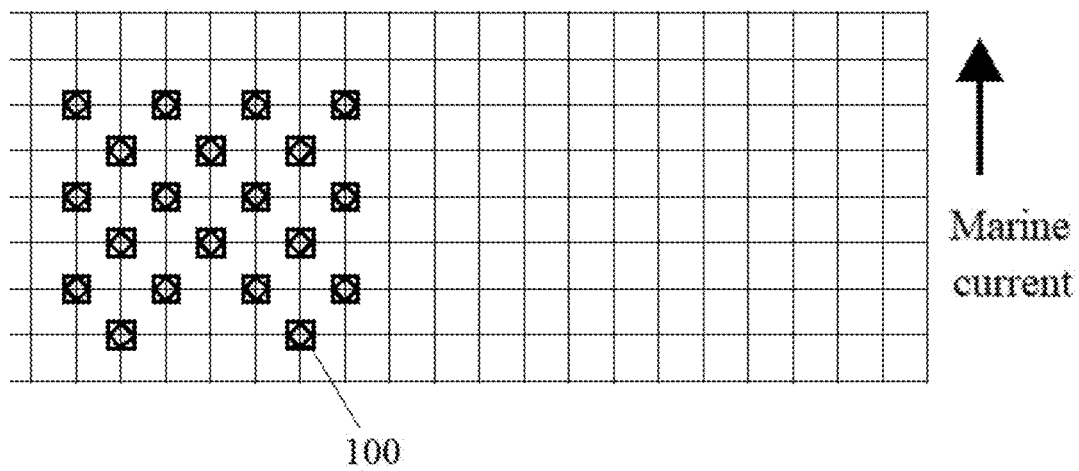
FIG. 8 is a schematic diagram of multiple artificial reefs according to the present disclosure when they are arranged in the form of 243434 in a marine current direction.

When in use, multiple artificial reefs 100 in this embodiment are arranged in a water area in the form of 241434 in a marine current direction, as shown in FIG. 7, or in the form of 243434 in the marine current direction, as shown in FIG. 8. An automatic unhooking device can be used for placing the artificial reef 100, and the artificial reef 100 is unhooked after making contact with the natural mud surface.

Specific examples are used herein for illustration of the principles and embodiments of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An artificial reef, comprising:
a bottom plate;
a reef main body; and
a pipe rack,
wherein the reef main body is of a hollow structure comprising an upper end and a lower end, wherein the upper end and the lower end of the reef main body are open,
wherein the reef main body comprises a bottom that is connected to the bottom plate,
wherein the reef main body comprises a plurality of sides and each of the plurality of sides of the reef main body are arranged obliquely towards an inner side from the lower end to the upper end,
wherein the pipe rack comprises a plurality of pipe bodies assembled into a grid shape, wherein each pipe body of the plurality of pipe bodies has a first end and a second end, and wherein each two of the pipe bodies of the plurality of pipe bodies are connected to each other and are in communication with each other at an intersection thereof,
wherein the pipe rack is arranged in the reef main body with the first and second ends of each pipe body of the plurality of pipe bodies extending through two sides of the reef main body respectively to communicate with an outside of the reef main body, and
wherein the first and second ends of each pipe body are fixed to the two sides of the reef main body, respectively, and each of the bottom plate and the reef main body is made of a reinforced concrete structure of high corrosion-resistant steel bars and modified seawater and sea sand concrete.

2. The artificial reef according to claim 1, wherein a plurality of groups of holes are sequentially formed in each side of the reef main body from bottom to top, the both ends of each pipe body are located in respective groups of holes, and a plurality of hanging rings are arranged at a top of the reef main body.

3. The artificial reef according to claim 2, wherein four groups of holes are sequentially formed in each side of the reef main body from bottom to top, the four groups of holes are a first group of holes, a second group of holes, a third group of holes, and a fourth group of holes from bottom to top; the first group of holes comprises a plurality of first holes sequentially formed in a side of the reef main body along a length direction of the side of the reef main body; the second group of holes comprises a plurality of second holes sequentially formed in the side of the reef main body along the length direction of the side of the reef main body; the third group of holes comprises a plurality of third holes sequentially formed in the side of the reef main body along the length direction of the side of the reef main body; and the fourth group of holes comprises a plurality of fourth holes sequentially formed in the side of the reef main body along the length direction of the side of the reef main body.

4. The artificial reef according to claim 3, wherein the sizes of the first holes, the second holes, the third holes and the fourth holes decrease in turn, the first holes are rectangular holes, and the second holes, the third holes and the fourth holes are all circular holes.

5. The artificial reef according to claim 3, wherein one end of each pipe body is fixed into one third hole of the third holes by a fixing assembly, and the fixing assembly comprises an embedded bolt, a locking nut, a limiting sheet, and two fixing bolts; the embedded bolt is pre-embedded in a bottom surface of the third hole; lower parts of both ends of each pipe body each are provided with a bolt connecting hole; the bolt connecting hole is configured for the embedded bolt to pass through; the locking nut is installed on an upper part of the embedded bolt; the limiting sheet covers an upper part of one end of the pipe body; and each of both ends of the limiting sheet is fixed to a side wall of the third hole by one fixing bolt of the two fixing bolts.

6. The artificial reef according to claim 3, wherein a fence is arranged in each of the fourth holes.

7. The artificial reef according to claim 2, wherein the bottom plate is a hollow rectangular plate, and the reef main body comprises four load-bearing columns, four side walls, four cross beams, four first supporting beams, and four second supporting beams; lower ends of the four load-bearing columns are arranged on four corners of the bottom plate, respectively, the four side walls are arranged between two adjacent load-bearing columns respectively, and bottoms of the four side walls are connected to the bottom plate; the plurality of groups of holes are sequentially formed in each side wall from bottom to top; the four cross beams are arranged at tops of the four side walls respectively, and both ends of each cross beam are connected to two respective load-bearing columns of the four load-bearing columns; one hanging ring is arranged at a top of each load-bearing column of the four load-bearing columns, and the four first supporting beams are arranged between two adjacent cross beams respectively, and the four second supporting beams are arranged between two adjacent side walls respectively.

8. The artificial reef according to claim 1, wherein a plurality of aligning connection holes are sequentially formed in the pipe bodies in a length direction of the pipe body, each aligning connection hole penetrates through both sides of the pipe body, and a plurality of through holes are formed in a side wall of the pipe body.

9. The artificial reef according to claim 1, wherein the modified seawater and sea sand concrete comprises seawater, sea sand, a steel bar rust inhibitor, a chloride ion curing agent, cement, gravel, a water reducing agent, fly ash, mineral powder, and a defoaming agent.

10. The artificial reef according to claim 9, wherein the steel bar rust inhibitor comprises 50 parts of N, N-dimethyl ethanolamine, 30 parts of polycarboxylic acid terpolymer, 10 parts of 2-phenylimidazoline quaternary ammonium salt, 15 parts of hydroxide, 5 parts of waterborne polyaniline, 5 parts of polyhydric alcohol phosphate ester, and 60 parts of water.

* * * * *